Jan. 2, 1934.           H. E. HOLCOMB           1,941,985
                      COMPOSITE SHEETING
                      Filed June 18, 1929

Inventor,
Harry E. Holcomb,
By D. N. Halstead
Attorney

Patented Jan. 2, 1934

1,941,985

UNITED STATES PATENT OFFICE 1,941,985

COMPOSITE SHEETING

Harry E. Holcomb, Bound Brook, N. J., assignor to Fiberfraks Inc., New York, N. Y., a corporation of New York Application June 18, 1929. Serial No. 371,962

5 Claims. (Cl. 154—45.9)

This invention relates to composition sheeting and particularly to such materials as cementitious slabs such as cement singles, asbestos board and allied products.

The manufacture of composition sheeting, cement slabs or slabs made from asbestos or other fibrous material has been carried out in the past by a process which is in some respects similar to the methods of making paper.

This application is a continuation in part of the applicant's U. S. Patent 1,819,840, based upon his co-pending application Serial No. 250,558, filed June 30, 1928, which describes a process of manufacturing such slabs. In accordance with the process as described in the above-mentioned application layers of material having the same or different compositions are applied to a conveyor, a portion of the water removed therefrom and the layers pressed. In applying the composition to the conveyor by the process and apparatus described in this patent, the composition is deposited in a "felted" structure which characterizes webs or sheet material made on "wet process" machines, such as described in this patent and the fibers contained in the composition, due to the drawing action of the cylinder rolls, are disposed in the sheet material in such a way that they tend to extend in a generally longitudinal direction in the sheet. The layers of material so formed are moved in substantially a single plane into overlapping relation with other layers of material formed in a similar way and the two groups of layers in turn applied in a similar manner to one or more other layers in a continuous operation and without distorting the sheet of material so that the fibers contained in the mixture making up the various layers are present in the final product in substantially the same position normal to the surface of the sheet as when they were originally applied to the conveyor.

One of the objects of the present invention is to provide a composite or multi-ply sheet of material in which the fibers are in substantially the same position in the finished product as when the sheet was originally formed.

Another object of the invention is to provide a novel type of cementitious slab made up of a plurality of layers of the same or different compositions assembled to form a durable and permanent slab of material.

These and other objects of the invention will be more fully understood from the following description and drawing illustrating a preferred form of the invention.

In accordance with the present invention the composition sheeting is preferably produced by the process described in the above mentioned copending applicaton but the product may be produced by any other suitable method of apparatus in order to obtain the product desired.

Cementitious slabs made in accordance with the present invention may include as ingredients a large number of materials and the various layers of material making up the slab may differ widely from each other. However, the product should contain a sufficient amount of cementitious or plastic material to give the requisite durability and rigidity to the slab for the purpose for which it is to be employed. For example, in the manufacture of shingles it has been found that a very satisfactory product can be obtained by employing a mixture containing 50% or more by weight of hydraulic cement with animal, vegetable or mineral fiber. A typical example of such a mixture consists of about 5 or 6 parts of Portland cement and 1 part of asbestos fiber. The entire shingle may be made up from this composition or the inner layers of the shingle may be made from some other composition. For example, the inner layers of the shingle may consist of 8 or 9 parts of cement and 1 part of some fiber which is cheaper than asbestos, such as rag felt, hair, wood fiber or any other suitable material.

Certain of the layers of the shingle or slab may include a filler material preferably a material of a colloidal nature such as finely ground clay or infusorial earth. Any other suitable filler material may be employed although it is of advantage in manufacturing sheets in accordance with the process as described in the above-mentioned application that the filler material should remain uniformly suspended in the mixture so that the composition of the mixture will be uniform and not be affected by the settling out of heavy constituents. For certain purposes the filler material may make up as much as 20% or more by weight of the entire composition for any particular layer. The proportions and characteristics of the filler material will largely depend on the nature of the slab to be produced or the nature of any of the particular layers to be employed in the composite slab.

In the manufacture of colored shingles and slabs it is desirable to add some coloring material and this may be effected by adding a pigment or colored composition to one or more of the mixtures making up one or more of the layers of the sheet. The amount of pigment employed will vary with the product to be produced and the nature of the pigment but will ordinarily be less than 15% by weight of the total weight of the mixture. Such coloring material and pigments are ordinarily expensive and therefore it will often be desirable to add the coloring material only to the outer layers of the sheet while the inner layers of the sheet may be made up of substantially the same or a different composition to which no pigment has been added.

The cementitious or plastic material employed is preferably hydraulic cement or other material which is not greatly affected by moisture after the product is in use.

Ordinarily when the slab is to be employed for shingles or for use under conditions in which the slab will be exposed to wide changes of temperature, and to the erosive action of wind, rain, etc., the composition will contain a larger proportion of hydraulic cement than will be required for wallboards and the like which are to be used only in the interior of a building or which are not subjected to the severe usage to which shingles and roofing compositions are subjected.

I will explain the invention with reference to the accompanying drawing which illustrates several practical embodiments thereof to enable others to adopt and use the same, and will summarize in the claims the novel features of construction and novel combinations of parts for which protection is desired.

Figure 1:
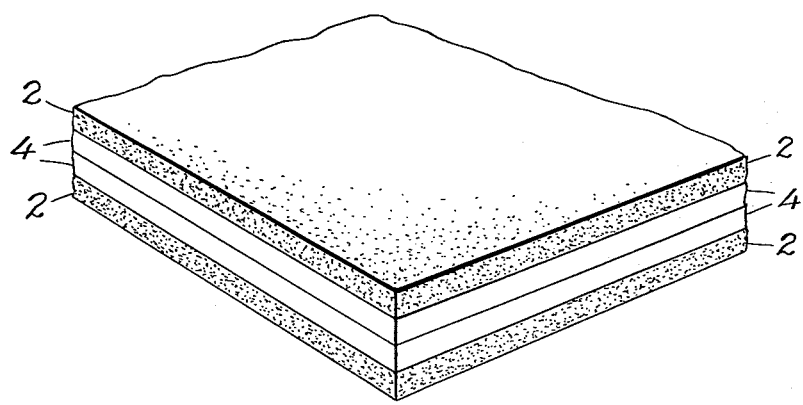
Fig. 1 is a perspective view of a portion of a shingle containing four layers.
Figure 2:
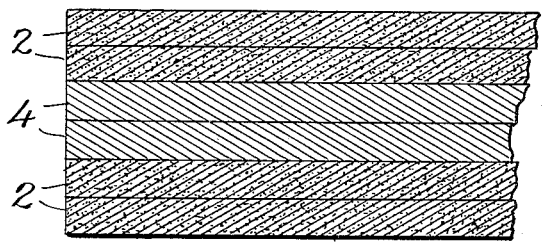
Fig. 2 is a cross-section showing a modified form containing six layers.

As a typical example of a shingle made in accordance with the present invention the shingle illustrated in Fig. 1 of the drawing is formed with the outer layers 2 of the shingle made up of a composition having 15 or 20% by weight of mineral fiber such as asbestos and the remainder of the layer consisting of hydraulic cement with or without a pigment. The inner layers 4 of the shingle are made of a composition having approximately 50% by weight of animal or vegetable fiber such as hair, rag felt or the like, the remainder of the composition being made up of hydraulic cement. The shingle illustrated in Fig. 1 comprises four layers, the layers numbered 2, being the layers of the shingle which will be exposed in the final product, are made up of the first composition and the two inner layers numbered 4 are made up of the second composition. If the shingle is made up of six layers as shown in Fig. 2, the first and second and the fifth and sixth layers of the shingle may be made up of the first composition, whereas, the third and fourth being the inner layers of the shingle, may be made up of the second composition.

The sheets may be made up in a large number of combinations of layers of material having the same or different compositions depending upon the particular use for which the sheet is to be employed and the thickness of the individual layers of the slab may be varied as desired for any product. However, the layers of the sheet will seldom contain more than 15% by weight of pigment or more than 20% by weight of filler material such as infusorial earth, together with sufficient cement or plastic material to give the final product the necessary rigidity and sufficient adhesive qualities to insure a permanent bond between the superimposed layers of the slab. In some instances certain layers of the shingle or slab may not contain any fiber whatever and in those layers of the material having fiber as a constituent the fiber is preferably present in the finished product in substantially the same position normal to the surface of the sheet as when the material was first formed into a layer.

The particular proportions of the materials used will depend upon the nature and character of the product to be produced and therefore it is not intended that the specific proportions given in the example cited shall limit the scope of the invention except as defined by the claims.

The word "cement" as used herein refers to a material such as Portland cement or other hydraulic cement adapted to form a hard rock-like material. In referring to the words "sheet" and "sheet material" in the accompanying claims, I intend to include not only articles so thin as to be necessarily thought of as sheets, but also articles of greater thickness which might more properly be defined as slabs, or plates, or even blocks; furthermore, the sheet may be flat or curved or other shape, provided only that it is of substantially uniform thickness so that it may be built up in a number of thin uniform sheets without objectionable distortion thereof.

What is claimed as new is:

1. A hard sheet comprising an outer layer of asbestos-cement composition containing approximately 20% of mineral fiber and approximately 80% of cement; and an inner layer of a composition consisting of approximately equal parts of organic fiber and cement.

2. A hard sheet comprising an outer layer of felted asbestos-cement composition containing approximately 20% of mineral fiber and approximately 80% of cement, and an inner layer of a composition consisting of approximately equal parts of organic fiber and cement, the fibers of said layers and the cement thereof being intermingled at the interface between them so as to form an integral sheet.

3. A hard sheet comprising an outer layer of asbestos-cement composition containing approximately 20% of mineral fiber; and an inner layer of a composition of cement and approximately 50% of organic fiber.

4. A hard sheet comprising an outer layer of felted asbestos-cement composition containing approximately 20% of mineral fiber; and an inner layer of a composition of cement and approximately 50% of organic fiber; the fibers of said layers and the cement thereof being intermingled at the interface between them so as to form an integral sheet.

5. A hard sheet comprising an outer layer of asbestos-cement composition containing not more than 20% of filler, and an inner layer of a composition of approximately equal parts of organic fiber and cement.

HARRY E. HOLCOMB.